July 9, 1929.  W. H. BARTON  1,720,026
METHOD FOR SLAKING LIME AND PRODUCING HYDRATE OF LIME
Filed Oct. 18, 1926
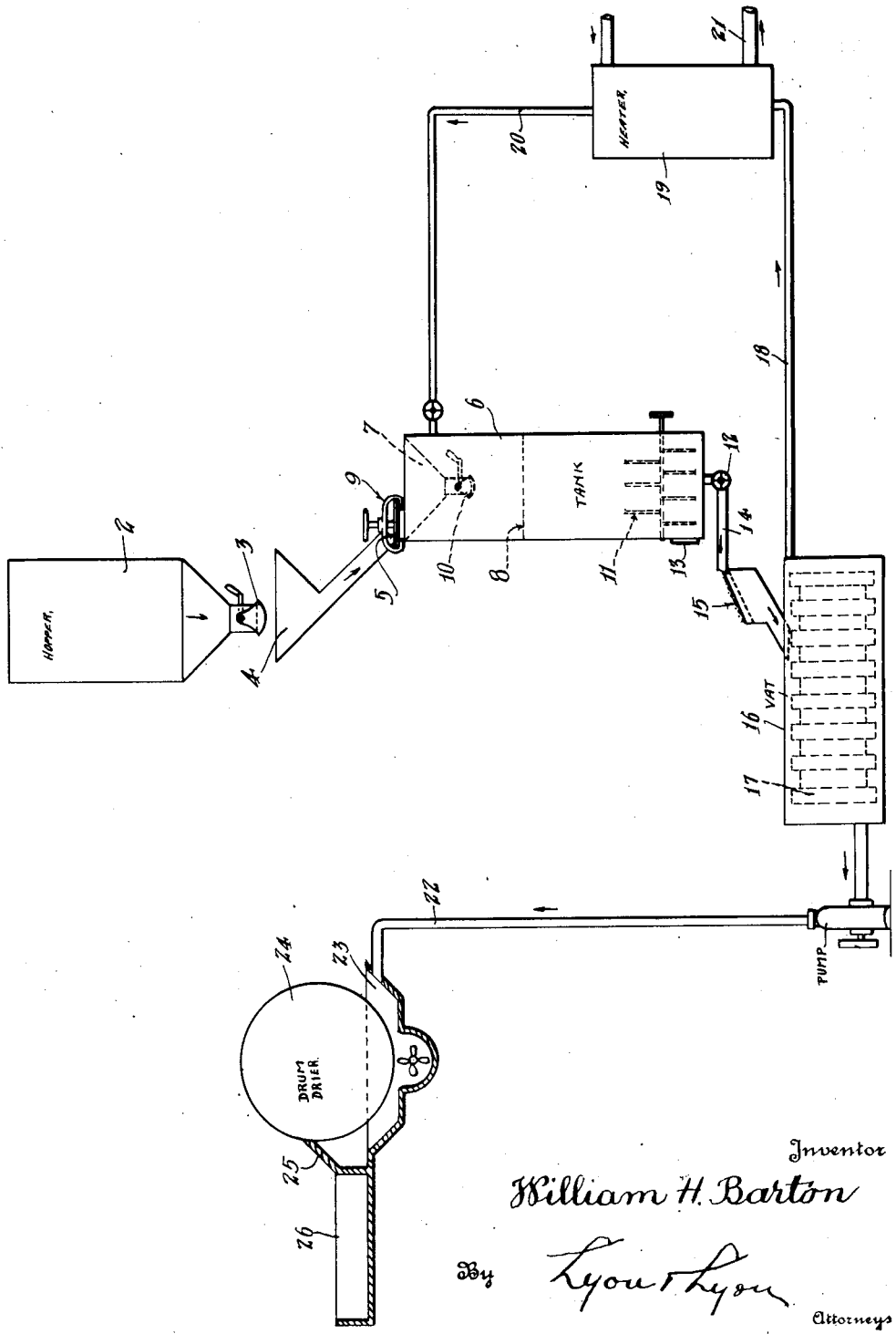

Patented July 9, 1929.

1,720,026

UNITED STATES PATENT OFFICE.

WILLIAM H. BARTON, OF LOS ANGELES, CALIFORNIA, ASSIGNOR TO BLUE DIAMOND COMPANY, OF LOS ANGELES, CALIFORNIA, A CORPORATION OF CALIFORNIA.

METHOD FOR SLAKING LIME AND PRODUCING HYDRATE OF LIME.

Application filed October 18, 1926. Serial No. 142,180.

This invention relates to a method for producing slaked lime and hydrated lime.

Heretofore, it has generally been necessary, after slaking of lime, to store the slaked lime for a substantial period of time or, as termed in the art, to "age" the slaked lime.

It is an object of the present invention to provide a method for slaking lime by which a slaked lime may be produced which requires no aging but which is equal to or superior in quality to the products produced by the prior apparatuses and processes.

The slaking of lime consists in the addition of water to the burned or quick lime, whereby there is a chemical reaction between the lime and water to form hydroxid of lime or $Ca(OH)_2$, the reaction taking place in accordance with the formula $$CaO + H_2O = Ca(OH)_2.$$

If sufficient water is added to leave the lime wet, it is called lime putty, and if only enough water is added so as to form as a result of the reaction a dry powder, it is called hydrated lime. If more water is added to the powdered hydrated lime, putty is formed as in the first case. However, the ordinary hydrated lime will not, with the addition of water, produce as much lime putty in point of volume as if the quick lime was originally slaked to produce lime putty and, furthermore, the quality of the putty produced is inferior. This is for the reason that if quick lime is first slaked without sufficient water, it is "burned" and the particles of lime do not go through the proper expansion, the volume of putty is decreased and likewise the working quality of the putty, there being a close relation between volume and plasticity or working quality. This "burning" is due to the lack of water to satisfy and absorb the heat of the chemical reaction and permit the heat or energy developed thereby to be expended in the expansion of the lime particles. If lime particles become dry or partially so during slaking or hydrating, they fail to expand to the maximum, and this physical condition of lime particles in the resulting putty causes a smaller volume of putty, less sand carrying capacity and less plasticity or spreading capacity. If too much cold water is added, the chemical reaction is retarded and the heat or energy generated by the chemical reaction is expended in heating the water rather than in the expansion of the lime particles.

I have discovered that if quick lime is slaked in hot water under pressure or in a closed vessel, the chemical reaction is encouraged and the heat or energy of the chemical reaction is saved for the expansion of the lime particles. When quick lime is added to hot water, such as at or near the boiling point, there is a violent boiling or agitation of the mass and if sufficient water is added so that there is plenty of room for each lime particle to expand, the maximum expansion is obtained and each particle of lime is exploded into an irregular, flocculent mass. In this way, the maximum volume of putty from a given quantity of quick lime is obtained and the putty is greatly improved in its working qualities. Moreover, it appears that the putty or slaked lime produced in this manner does not require any aging prior to its use except as may be necessary to remove the excess water and reduce putty to a workable consistency. In accordance with the usual processes of producing slaked lime, it is necessary to age the lime or the lime, upon use, will blister due to the presence of unslaked lime. This appears to be due to the fact that the slaking of lime as ordinarily carried out with cold water results in some particles of quick lime being coated over with the slaked product before said particles of lime are completely slaked, with the result that it is necessary to age the slaked lime to insure that these unslaked particles of quick lime will be slaked prior to the use of the product.

It further appears that in most limes, there are different degrees of burning or calcining of the lime due either to irregularities of the physical condition or impurities in the original stone or due to the irregularity of the burning or calcining of the lime. If there is present overburned lime, this is slower in slaking and in the presence of cold water where the chemical reaction is less strong the overburned lime will not slake or react chemically with the water in the ordinary course of time allowed for the making of putty.

In accordance with the process of the present invention, by the use of the hot water in the slaking process, the reaction is caused to proceed with such violence that all of the particles of the quick lime are exploded and positively brought in contact with the slaking water so that immediately a product is produced in which every particle has been properly slaked and, therefore, the putty produced is ready for instant use as a high grade product.

Furthermore, it is found that the putty produced in accordance with the present invention possesses the additional property of being adapted to be dried into the form of a hydrated lime in which the product is in the form of a dry powder and that said dry powder may be thereafter admixed with water to form a lime putty for use. This ability of the lime putty of the present invention to form satisfactory hydrated lime is not possessed by the common forms of lime putty. It has heretofore been found that when lime putty is dehydrated to the form of hydrated lime that said hydrated lime will not again react with water to form a satisfactory lime putty but the lime putty produced is unstable, dense, and of little covering power.

The present invention, together with various further objects and advantages of the same, will best be understood from a description of the preferred method and apparatus embodying the invention. Reference is therefore made to the accompanying drawing, in which there is indicated diagrammatically a suitable apparatus for the production of slaked lime putty and hydrated lime.

In the drawing, 2 indicates a weighing hopper provided at its bottom with a valve 3. From the weighing hopper 2, the quick lime may be fed into a spout 4 of an opening 5 in the top of a tank 6, passing first into a receptacle 7, provided in the top of said tank 6. Water which has been heated to substantially its boiling point is fed into the tank 6 to approximately the height of three-fifths (3/5) of the volume of the tank 6, as indicated at 8. The weight of water employed should correspond to approximately eight times the weight of the quick lime to be slaked. After the addition of the water into the tank 6 and the quick lime into the receptacle 7, the opening 5 should be closed by means indicated at 9. The bottom of the receptacle 7 is indicated as provided with a valve 10 which should have an operating handle extending through the sides of the tank. After the tank is closed, this handle is then actuated to open the valve 10 and dump the quick lime into the hot water in the remainder of the tank. The contact between the quick lime and boiling water sets up a violent boiling action akin to an explosion so that each particle of the quick lime is thoroughly slaked and separated from unburned rock or other impurities therein.

The bottom of the tank 6 is preferably indicated as provided with an agitator 11 for stirring the mass after which the mass may be permitted to settle to the bottom and be removed through a valve 12. There is also preferably provided a man hole 13, which may be employed for cleaning out the tank 6 or for repair work.

The lime putty withdrawn from the valve 12 is passed through a line 14 and over an inclined screen 15 where the coarse particles may be removed. From the inclined screen 15, the putty flows into a vat 16. The vat is preferably provided with suitable means, such as indicated at 17, for passing water through the vat separated from the lime putty in order to cool the putty and at the same time preheat the water. From the vat 16, there is a line 18 for passing the water to a heater 19 from which the water may be passed through a line 20 to the tank 6 for the production of further lime putty. The heater 19, in practice, may be heated by stack gases from a line 21 of a lime kiln, or by any other suitable means.

The material within the vat 16 is now in condition for use as first class lime putty without the necessity of any intermediate storage or aging of the lime putty, except as may be necessary to remove excess water and reduce putty to workable consistency.

If desired, however, it may be processed to form hydrate of lime, in which case, the putty is fed into a trough or line 22 and into a pan or trough 23 in which a revolving cylinder 24 of a drum drier operates. The drum drier may be heated by any usual means, such as low pressure steam, and the putty is dried thereby to a powder and scraped off by a knife 25 and deposited in a receptacle 26. It is obvious that in place of the drum drier, any other proper drying apparatus may be employed for this stage of the process.

The powder, when removed, may be ground or pulverized to produce a more uniform product. The product thus produced when admixed with water, is found to produce a putty of substantially equal volume and quality to the original putty.

While the process of slaking lime and producing lime putty and lime hydrate herein described is well adapted to accomplish the objects of the present invention, it is understood that various modifications and changes may be made in the details of the process or apparatus without departing from the present invention and the present invention includes all such modifications and changes as come within the scope of the appended claims.

I claim:
1. A process of slaking lime which com- prises mixing quick lime with water at or near its boiling point, the water and lime being admixed in proportions sufficient to produce a lime putty.

2. A process of slaking lime which comprises admixing water near its boiling point with quick lime, and maintaining the admixture under an evolved pressure greater than atmospheric.

3. A process of the class described which comprises admixing quick lime with hot water in sufficient quantities to produce a lime putty in a closed vessel, and thereafter dehydrating the putty to a powder.

4. A process of the class described which comprises admixing quick lime and water near its boiling point, the proportions of quick lime and water being sufficient to produce a lime putty, maintaining the admixture under an evolved pressure greater than atmospheric, and thereafter dehydrating the lime putty to a powdered hydrate.

5. A process of slaking lime to form a stable, plastic, artificially aged lime putty comprising adding quick lime to a body of hot water in quantity sufficient to completely hydrate the quick lime, and maintaining the mixture in a closed vessel until hydration is substantially complete.

6. A process of making dry hydrated lime adapted to form a plastic lime putty comprising slaking lime to form an artificially aged lime putty by adding quick lime to a sufficient quantity of hot water to completely hydrate the quick lime, in a closed vessel, and then drying the lime putty.

Signed at Los Angeles, California, this 12 day of October 1926.

WILLIAM H. BARTON.